United States Patent
Larsen et al.

(12)

(10) Patent No.: US 7,441,484 B1
(45) Date of Patent: Oct. 28, 2008

(54) CNC PRESCRIBE METHOD TO ENCOURAGE CHIP BREAKING

(75) Inventors: Eric R. Larsen, Peoria, IL (US); Marion B. Grant, Jr., Princeville, IL (US); Michael P. Vogler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/823,918

(22) Filed: Jun. 29, 2007

(51) Int. Cl.
*B23B 1/00* (2006.01)
*B23B 27/10* (2006.01)

(52) U.S. Cl. .............................. 82/1.11; 82/158; 82/50; 82/904; 407/2; 407/4; 407/6

(58) Field of Classification Search .................. 82/1.11, 82/50, 904, 158; 408/1; 407/2, 4, 6
See application file for complete search history.

(56) References Cited

U.S. PATENT DOCUMENTS

| | | | |
|---|---|---|---|
| 4,465,412 A | | 8/1984 | Zweekly |
| 4,643,056 A | * | 2/1987 | Arehart et al. ................. 82/159 |
| 5,342,152 A | * | 8/1994 | Medeksza .................... 408/1 R |
| 5,384,446 A | | 1/1995 | Rutkowski |
| 5,765,456 A | * | 6/1998 | Grossmann ................. 82/1.11 |
| 6,026,719 A | * | 2/2000 | Li ................................. 82/1.11 |
| 6,184,924 B1 | | 2/2001 | Schneider et al. |
| 6,302,004 B1 | | 10/2001 | Taylor |
| 6,328,117 B1 | | 12/2001 | Berzas et al. |
| 7,097,395 B2 | * | 8/2006 | Horiuchi et al. ............. 408/1 R |
| 2006/0096964 A1 | | 5/2006 | Fordahl |

* cited by examiner

*Primary Examiner*—Willmon Fridie
(74) *Attorney, Agent, or Firm*—Janda Carter

(57) ABSTRACT

A method for pre-scribing a workpiece to facilitate chip breaking when machining the workpiece on the same machine with the same tooling used for cutting, utilizing an invokable CNC cycle of the CNC machine completing the workpiece machining. The machine includes a frame, a headstock mounted on the frame, spindle fixturing supported in the headstock for holding the workpiece, a spindle fixturing drive for rotating the spindle fixturing, a rotatably indexing tool for machining having one or more cutting edges, the tool adaptable for pre-scribing the workpiece, the method including the steps of placing the workpiece in the spindle fixturing oriented in a cutting position for machining, indexing the tool down the axial direction of the rotatable workpiece with the edge of the tool in scribing contact with the workpiece on the machining surface, pre-scribing a grooved notch along the workpiece in a line pattern with the grooved notch being scribed at a depth less than the depth of the final machining depth, and, machining the workpiece to the final machining depth.

8 Claims, 3 Drawing Sheets

CNC PRESCRIBE METHOD TO ENCOURAGE CHIP BREAKING

TECHNICAL FIELD

The present disclosure relates generally to a method of machining, and more particularly to the use of an invokable CNC cycle of the same CNC cutting machine for scribing groove lines into a workpiece to produce short chip segments or facilitate chip breaking during machining operations.

BACKGROUND

Machining operations of various configured metal workpieces are a standard throughout the world, and are especially common with vehicular components. These operations include boring, drilling, milling, or other metal cutting turning operations executed with various types of cutting tools. As the cutting tool removes material, "chips" are created. In theory, the chips that are rather short, and fall to the bottom of the machining center, away from the tool and workpiece. However, in practice, these chips can become very long, stringy, and curly, and create enormous machining issues. Difficult-to-break chips are often generated in machining high toughness or soft gummy materials, such as pure aluminum, pure copper, aluminum alloys, copper alloys, low carbon steels, and stainless steels.

These continuous and curly shaped chips have long been known as a serious problem by-product of cutting operations. Long stringy chips can collect themselves into large bundles of razor-wire-like material ("hay") that must be cleaned out of the machines multiple times per shift. Additionally, these chips can scrape or otherwise mar the machined surface of the workpiece if they are allowed to remain intact during the machining operation. They can wrap themselves around the tool during machining and eventually slip under the tool nose, creating gouges in the workpiece.

While the formation of these long chips when using conventional manually operated machine tools may be of a slightly lesser concern, since the chips can be readily removed by the operator during their formation, there are still safety hazards because the long curling chips often form growing bundles which can cut the operator's skin while attempting to remove them. However, when using a computer programmed or other automated machine tools, especially, when the machine tools are enclosed in a housing, access to the workpiece for breaking or removing the chips is restricted so as to present a problem with to the respect to the generation and removal of the long continuous chips.

Computer numerically controlled (CNC) operations are pre-programmed machining steps for metal cutting operations performed sequentially on a workpiece spindled opposite a turret, typically within a cabinet. CNC machining requires the control of a number of variables in order to attain the maximum productivity for a given cutting operation. The reliability of machining operations is an essential aspect of modern automatic manufacturing systems. In the case of turning operations in which unbroken chips are the major obstacles for automation, reliability implies chip control as a major aspect.

Scribing a part for chip control is a simple first step before automated CNC machining; however, it does much more. Removing the chip control problem allows for dry machining with lower-cost and a more predictable tool life. It also reduces the number of machining passes needed, again slashing costs. Also, since the chips are controlled and no longer wrapping themselves around the tools and fixtures, then CNC based automated machine loading and unloading, automatic gauging, and automatic tool changing is possible without fouling.

Using the same CNC tool to prescribe a grooved pattern into a raw part that extends down into the part to create an interrupted cut during turning effectively and efficiently effectuates separation of the chips for total chip control. The distance between scribes or grooves on the part can be adjusted to define the actual chip size, and the depth of the scribe is adjusted to match the amount of material removal needed for the final part dimensions. Additionally, using the same automated tool, rather than adding a manual tool, or breakers, or localized heating, greatly decreases overall cycle time as would be understood by one skilled in the art.

U.S. Pat. No. 5,384,446, issued to Edward D. Rutkowski, attempts to overcome the problems described above by providing a path etched into a workpiece by a laser beam. The laser beam defines a pattern of chip breaking points and controls the length of the chips removed from the workpiece via a separate known machine-cutting element. The material is cut away from the workpiece along a second path, which periodically intersects with the first path. The Rutkowski suffers from at least one deficiency in that a separate laser device is introduced into the machining operation, which takes additional space, and significantly increases cost. The laser is a separate machine with a robot arm moving a fluent beam along the first path.

The present disclosure is directed to overcoming one or more of the problems set forth above.

SUMMARY

In one aspect, the present disclosure is directed to a method for pre-scribing a workpiece to facilitate chip breaking when machining the workpiece on the same machine used for scribing. The machine has a frame, spindle fixturing rotatably supported on the frame, a rotatably indexing cutting tool for machining having one or more cutting edges, the cutting tool adaptable for pre-scribing the workpiece, including the steps of placing the workpiece in the spindle fixturing, indexing the cutting tool down the axial direction of the workpiece, thereby scribing a grooved line along the workpiece, with the grooved line pattern being scribed at a depth less than the depth of the final machining cut, and, cutting the workpiece to the final machining cut depth.

DETAILED DESCRIPTION

Figure 1:
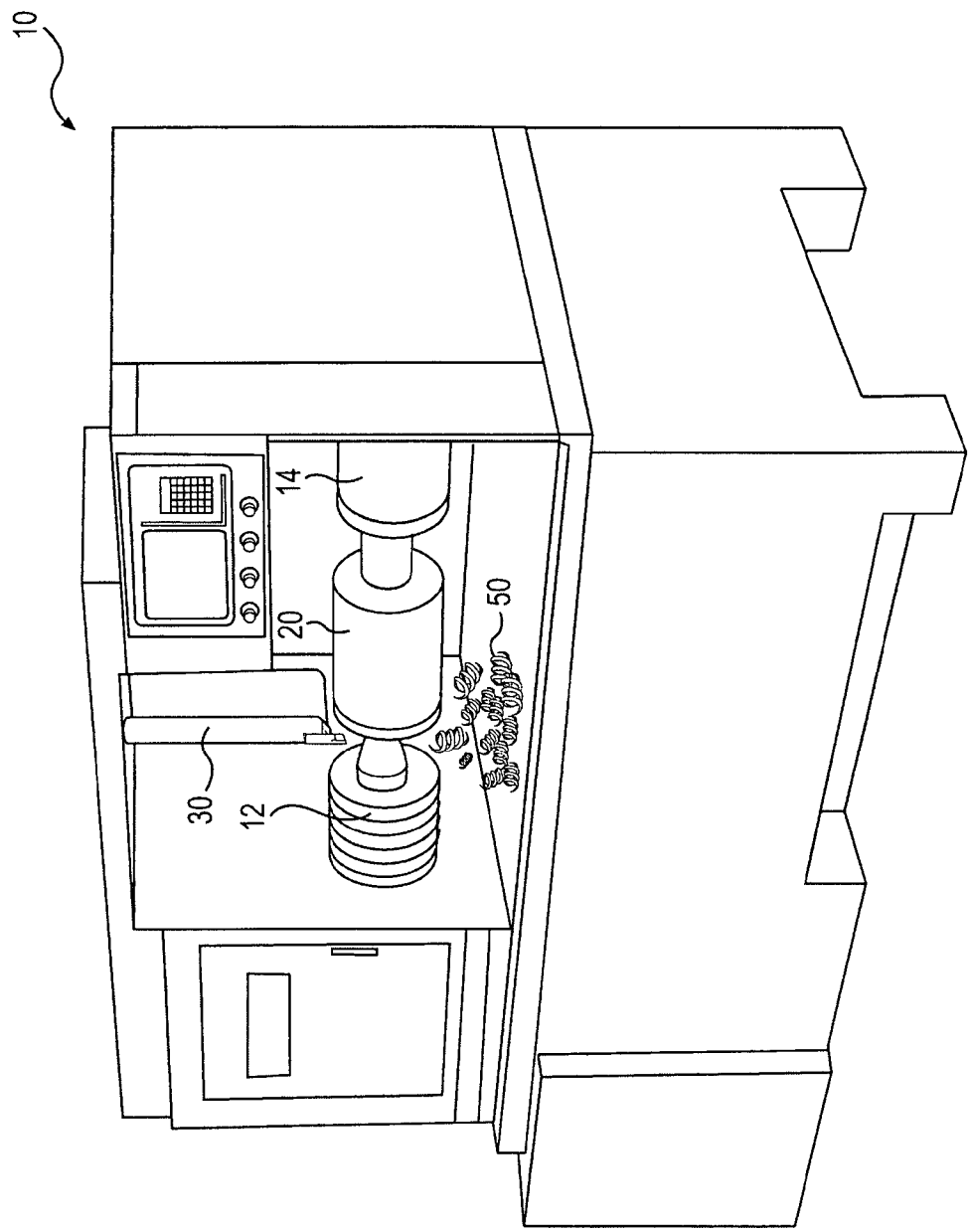
FIG. 1 is a diagrammatic illustration of a CNC machine according to an exemplary embodiment of the present disclosure.

FIG. 1 illustrates an embodiment of a machine 10 of the present disclosure. As briefly described above, the present disclosure is directed to CNC metal cutting and finishing machine tooling designed to prescribe a workpiece 20 thereby forming an integrated chip breaking system for the purpose of breaking chips 50 or turnings formed during the machining operation, prior to the generation of long continuous chips 50 which tend to scratch or otherwise mar the machined surface of the workpiece 20. The machine 10 of the present disclosure is an automated version of a traditional lathe generally including a bed carrying a headstock 12 and a tailstock 14 between which a workpiece 20 is typically held in a workholding device (chuck, center, collet, turret, etc) and is rotated by a spindle motor and drive axes (not shown). Such a lathe 10 may further include a carriage arranged for displacement along the bed and carrying a slide rest by which a machine tool 30 is held and traversed. On a typical turning machine, the tool 30 moves back and forth along the axial direction of the workpiece 20, and the machine 10 may optionally be enclosed in a housing (not shown) to confine machining coolant spray. The machine tool headstock 12 or a spindle may oscillate along a feed advance path. The oscillaratory motion may be provided using hydraulic, pneumatic, electromagnetic, piezoelectric or mechanical actuators, or the like.

Computer Numeric Control (CNC) is an automated way of positioning a cutting or other work tool 30 and driving the workpiece rotation by computer controlling the multiple drive axes. Tooling 30 used in turning operations is generally a prism with appropriate cutting edges 32 made of materials like hardened steels, tungsten carbide, and ceramics. These tools 30 may be coated to improve thermal resistance and durability, and are moved across the part by the machine axes to precisely peel off or shave off material from the workpiece 20. A typical tool 30 is comprised of a rake face and relief faces and a corner and edge radius, as is known in the art. The side relief face is separated from the rake face by the side cutting edge, the end relief face is separated from the rake face by the end cutting edge, and the side relief face and end relief face are blended together by a corner radius.

Figure 2:
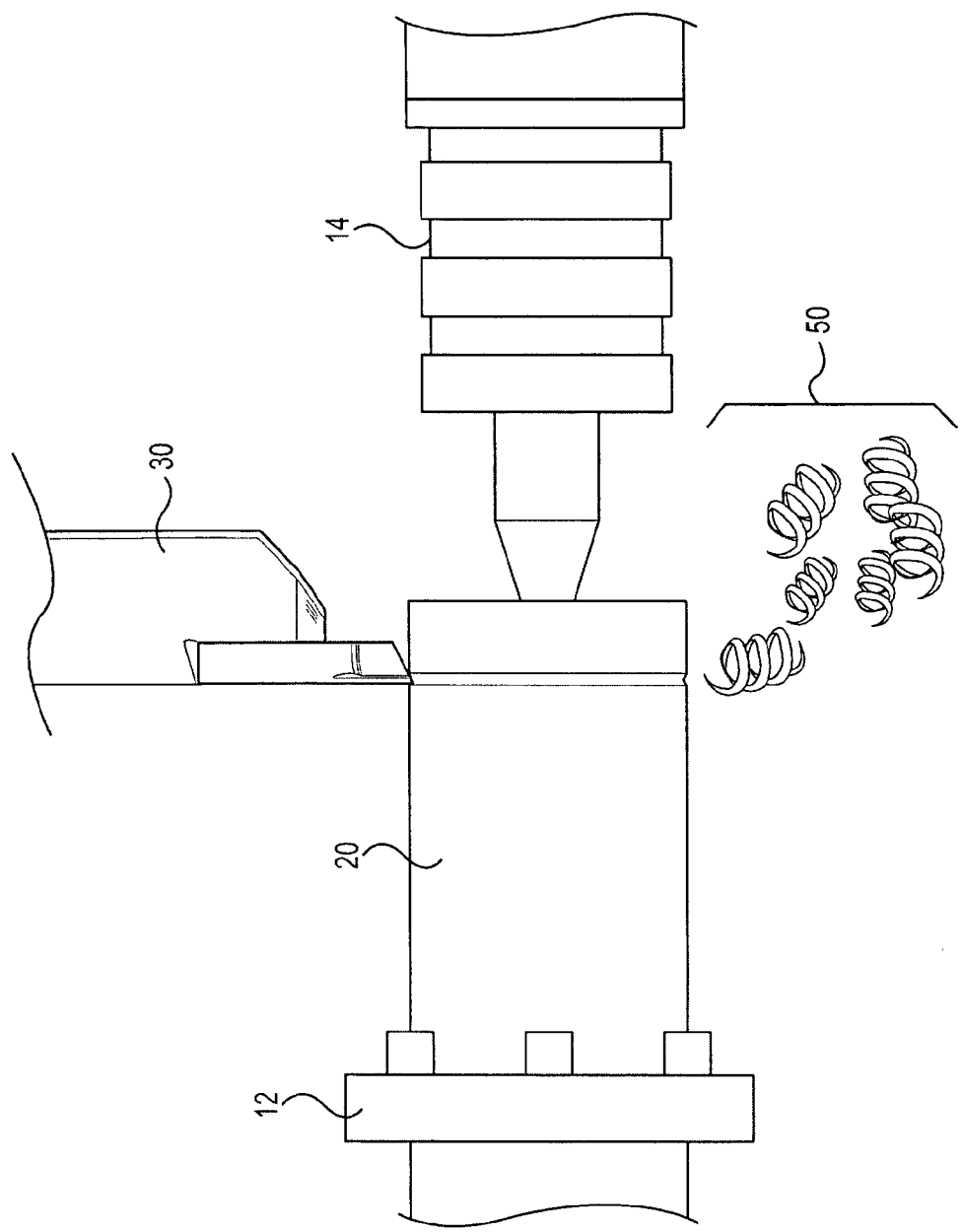
FIG. 2 is an partial exploded view of a workpiece and cutting tool of a CNC machine of the present disclosure; and, FIGS. 3-5 are views showing exemplary prescribe patterns on a workpiece of the present disclosure.

With reference to FIG. 2, an exploded partial view of CNC based automated turret lathe tooling 30 is generally shown in a working relationship with a workpiece 20. During the course of a material removing operation, a turret is typically rotated to selectively position the machine tool 30 (or machine tools of different cutting specifications) in a working relationship with the workpiece 20. The workpiece 20, in turn, is shown mounted in a suitable chuck and spindle arrangement for machining outer surfaces with tools. In prior art cutting operations, the relative velocity between the tool 30 and workpiece 20 is predominantly perpendicular to the rake face 32. In the present described disclosure the relative velocity between the tool and workpiece is predominantly perpendicular to either the side relief face 34 or the end relief face 36.

In an exemplary methodology, a lower than typical spindle speed and higher than typical feed rate are used to cut a helical notch or groove using the normal cutting edge of the tool 30. Typical spindle speeds during cutting are hundreds to thousands of revolutions per minute with typical feeds of fractional millimeters per revolution. This disclosure contemplates spindle speeds of approximately 0 to 10's of rpm and feeds of approximately millimeters to 10's of millimeters per revolution. The tool nose 30 may move along a wave-like (helical) path relative to the workpiece 20. The path wave has a certain amplitude (A) and length (mu).

The grooved notch depth is scribed at a depth less than the final machining cut depth, and may be cut through approximately eighty percent of the depth of the final cut. The grooved notch 40 may be completed in one pass of the tool 30 across the workpiece cutting surface, or intermediate pre-scribing and cutting steps may be added where the workpiece requires multiple passes of the cutting tool to achieve a pre-determined final machining cut depth.

Optionally, a standard groove tool (not shown) oriented ninety degrees from the typical grooving orientation may be used to notch down the axial direction of the part either in a straight line or helical path. Yet further, the edge radius 38 of the cutting tool 30 may be utilized as a grooving tool and cut with the side of the tool to produce a groove or scribe 40 down the axial direction of the part either in a straight line or helical path. Depending on the required overall efficiency of the operation, either of the tools may be employed to prescribe the workpiece 20 utilizing the same tool as the tool used in the machining operation. For example, when the turning insert is in the turret or is the next tool to be advanced, and a deep enough scribe can be created with the edge of the insert, then that tool may be used. When the groove tool is in the turret or is the next tool to be advanced, and a deeper scribe than what is achievable with one pass utilizing the edge of the standard turning insert is required, then the sideways rotated groove insert may be employed. For both the turn insert or the groove insert, the scribe may be created with the cutting edge as mentioned above (relative velocity between the tool 30 and workpiece 20 perpendicular to either the side relief face or the end relief face) or, the insert may be oriented perpendicular from its normal orientation and the tool moved with relative velocity between the tool 30 and workpiece 20 perpendicular to the rake face 32, as would be understood.

As would be understood by one skilled in the art, with all the methodologies, the depth of the scribed notch is less than the depth of cut required to produce the finished part geometry.

Prior to the standard material removing machining operation, an additional sequence that can reside in the computer numeric control (CNC) part program memory may be called by a controller that utilizes standard lathe tooling 20 to CNC scribe a programmed path 40 over the region to be machined to form a continuous notch or groove to break chips 50. Instead of a long and continuous chip, short and convenient-to-handle chip segments are produced.

Figure 3:
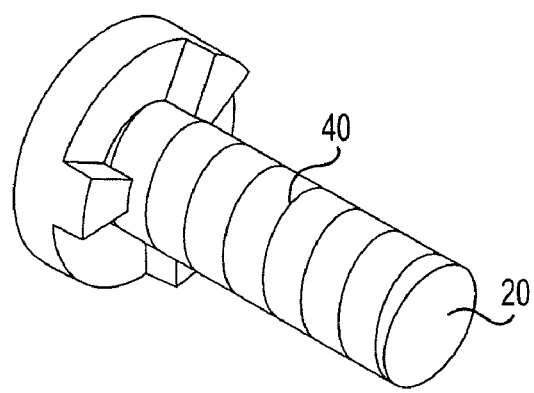
Figure 4:
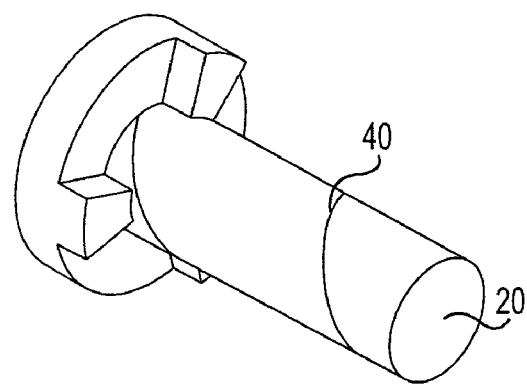
Figure 5:
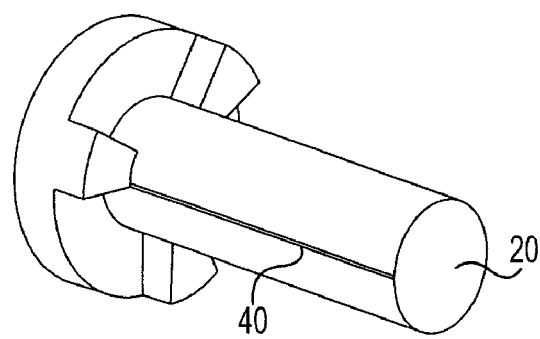

Turning now to FIGS. 3-5, exemplary embodiments of prescribe groove patterns 40 of the present disclosure are shown. The scribe or groove patterns 40 are mere examples of the multifarious types of patterns achievable. The different patterns are a function of the relative speed and feed velocities, based on efficiency, and part geometry. The different patterns are also a function of the length of chip 50 desired. A small diameter part will lend itself more to a straight scribe 40, where as a large diameter part will lend itself to a tighter helical scribe line 40. The length of chip will be the circumferential distance at one axial location from one groove 40 to the next.

Additionally, the size or depth of the notched groove pattern 40 may be adjusted depending on the type of material being machined or shape and size of the part. The disclosed method would be appropriate to numerous types of machining operations, as would be understood by one skilled in the art.

INDUSTRIAL APPLICABILITY

It will be seen that the present disclosure provides a mechanism by which undesirable ribbon-shaped long continues stringy cuttings or chips 50 generated during the machining of a workpiece 20 can be satisfactorily and automatically eliminated by using the same CNC tooling 30 to pre-scribe the workpiece 20 as is later used for milling or cutting the workpiece. Accordingly, the disclosed innovation may be seen as being a machining method, apparatus or accessory for existing CNC machine tools 30 to increase their productivity.

However, the disclosure as defined by the appended claims is deemed to cover various modifications of the embodiments disclosed herein, according to the scope of the claims, which modifications are deemed covered as equivalent structures as will be apparent to those of ordinary skill in the machine tool art. For example, CNC pre-scribing tools 30 have several diameters and lengths depending on the inset and cutting job, but all are designed to fit within the standard CNC tool holding bore. This method may be applicable to any cutting machine having automated capabilities. The method of this disclosure may also be particularly beneficial in boring, milling, and turning applications.

It will be appreciated that the foregoing description provides examples of the disclosed method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely, unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for pre-scribing a workpiece to facilitate chip breaking when machining the workpiece on the same machine with the same tooling used for cutting, said machine having a frame, a headstock mounted on said frame, spindle fixturing supported in said headstock for holding said workpiece, a spindle fixturing drive for rotating said spindle fixturing, a rotatably indexing tool for machining having one or more cutting edges, said tool adaptable for pre-scribing said workpiece, said method comprising the steps of:

placing said workpiece in the spindle fixturing oriented in a cutting position for machining;

invoking a CNC cycle of the same CNC machine completing the workpiece machining;

indexing said tool down the axial direction of said rotatable workpiece with said edge of said tool in scribing contact with said workpiece on the machining surface;

pre-scribing a grooved notch along the workpiece in a line pattern with the grooved notch being scribed at a depth less than the depth of the final machining depth; and, machining said workpiece to said final machining depth.

2. A method of claim 1, wherein said pre-scribing step is completed utilizing a standard cutting edge of a cutting tool.

3. A method of claim 1, wherein said pre-scribing step is completed utilizing a groove tool oriented ninety degrees from a standard normal grooving orientation.

4. A method of claim 1, wherein said pre-scribing step is completed utilizing an edge radius of said cutting tool as a grooving tool and scribing with the side of the tool.

5. A method of claim 1, wherein the relative velocity between said tool and said workpiece is predominantly perpendicular to a side or end relief face.

6. A method of claim 1, further comprising the steps of adding intermediate prescribing, invoking, and machining steps where the workpiece requires multiple passes of the tool to achieve a predetermined final machining depth.

7. A method of claim 1, wherein said line pattern for said grooved notch is helical.

8. A method of claim 1, wherein said line pattern for said grooved notch is along the axial line of said workpiece.

* * * * *